C. T. HOLLOWAY.
Fire Extinguisher.
No. 9,271. Reissued June 29, 1880.
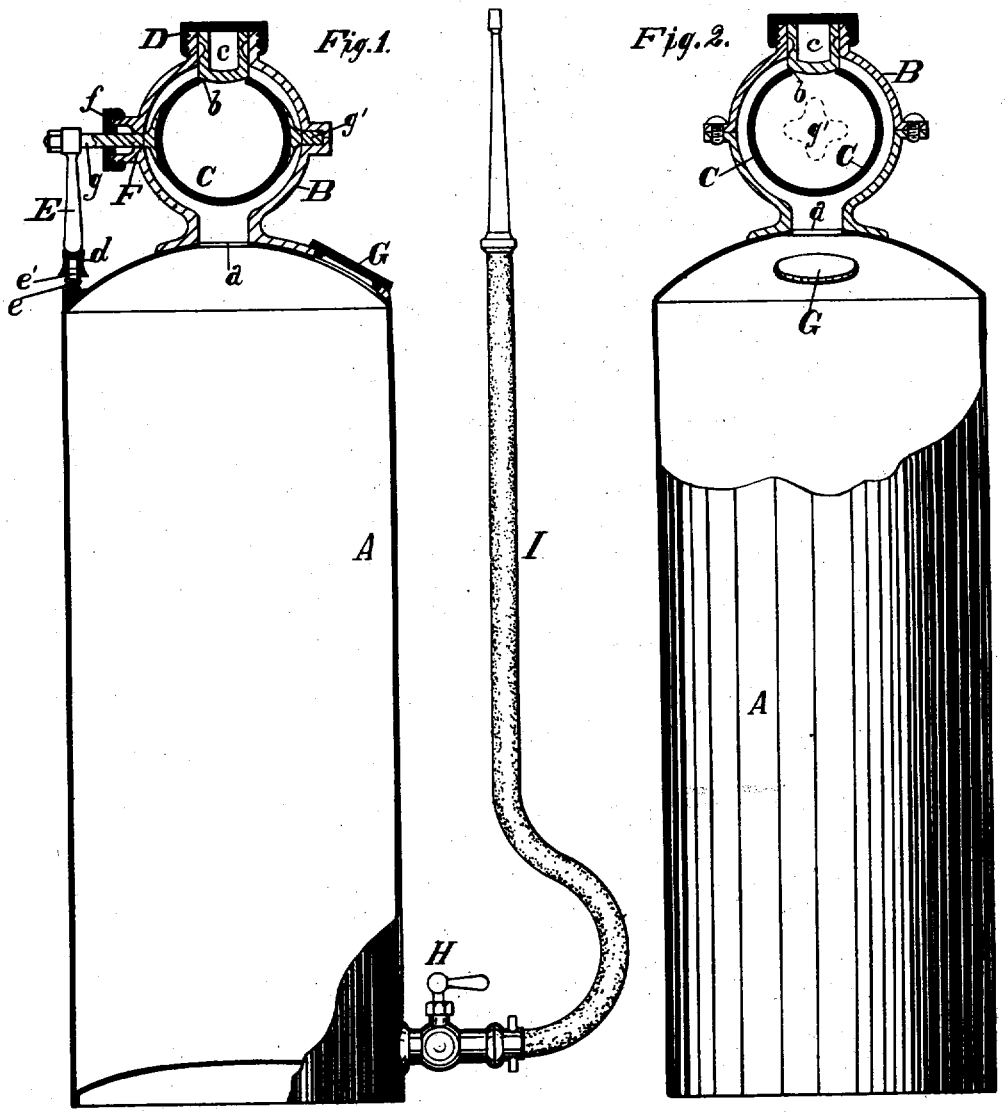
Witnesses:
Geo. A. Boydens.
A. C. Eader
Inventor:
Charles T. Holloway
By his Atty
Chas B. Manns
N. PETERS, PHOTO-LITHOGRAPHER, WASHINGTON, D. C.

UNITED STATES PATENT OFFICE.

CHARLES T. HOLLOWAY, OF BALTIMORE, MARYLAND.

FIRE-EXTINGUISHER.

SPECIFICATION forming part of Reissued Letters Patent No. 9,271, dated June 29, 1880.

Original No. 127,770, dated June 11, 1872. Application for reissue filed April 19, 1880.

*To all whom it may concern:*

Be it known that I, CHARLES T. HOLLOWAY, of the city of Baltimore, in the county of Baltimore and State of Maryland, have invented certain new and useful Improvements in Fire-Extinguishers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to that class of fire-extinguishers in which water strongly impregnated with carbonic-acid gas is the extinguishing agent and the expansive force of the gas the motor to eject the gas-impregnated water from the machine when it is desired to do so; and it consists in the improvements hereinafter set forth and claimed.

In the accompanying drawings, forming a part of this specification, Figure 1 is a sectional elevation of an extinguisher embodying my improvements. Fig. 2 is a part sectional elevation of the same transverse to that of Fig. 1.

Like letters of reference indicate corresponding parts of the invention in both figures.

The letter A designates a cylindrical vessel designed to hold the solution of soda in water. C designates a receptacle to hold the acid, and is mounted on suitable pivots or journals *g* and *g'*, one of which forms a shaft and extends through the casing to the outside, where a crank-handle, E, is attached, by means of which the acid-receptacle may be turned over to precipitate the acid in the alkaline solution. In the present example the form of the acid-receptacle is that of a hollow globe having an opening, *b*, through which it is filled with the acid when in an upright position, and is emptied of its contents when in an inverted position. The globe form of the acid-receptacle in the present example adapts it particularly for inclosure in the bottomless chamber B on the top or upper head of the main cylinder. In the present example this top part of the extinguisher-case is nearly globular in form. It opens into and at all times is directly connected with the main chamber or vessel. Its form, therefore, is not material, since the form does not at all modify or affect the rotating of the acid-receptacle.

On the extreme top of the apparatus is a mouth or opening, through which a suitable stopper, *c*, is inserted to close the opening *b* of the acid-receptacle. The stopper *c* is held in position by the cap D, which is attached to the outer case in any suitable manner to close the mouth or opening.

The journal *g* is rigidly secured in any suitable manner to the acid-receptacle, and extends through the case, where it is made tight by the packing-box F, having a suitable gland, *f*. The handle E is attached to the part of the journal which projects on the outside, and by means of this the movement of the acid-receptacle is controlled—that is, the receptacle may be upset to empty the acid and be righted again to replenish it. It is a positive means, operated from the outside, for turning the acid-receptacle in any position. Suitable provision is made on the outside of the apparatus to secure the acid-receptacle from accidental overturning, the object being to avoid the premature commingling of the acid and the alkali. In the present instance this is effected by means of a socket, *d*, resting on a spring, *e*, and sliding on a pin, *e'*. The socket is adapted to engage with the handle E in such manner as to secure it from movement, and thus, by mechanism on the outside of the apparatus, the acid-receptacle within the apparatus is not only secure from prematurely overturning after it is charged, but the said receptacle is held securely in an upright position with its mouth open to permit of being charged.

On top of the main chamber and at one side is an opening covered by a cap, G. This opening is for the admission of the water. A cock, H, connects with the main chamber, and is adapted for the attachment of hose I.

By the arrangement herein set forth the apparatus can be recharged with both or either the alkaline solution or the acid without removal of the acid-receptacle.

The operation of my extinguisher is as follows: Supposing that the machine is to be charged and made ready for use, the handle E is secured in the position shown, the caps D and G are removed, and the stopper *c* withdrawn. Water is then poured into the vessel A until it is nearly filled, when the soda is added. The acid is then introduced into the globe C, the stopper placed into position, and the caps replaced. This completes the charging of the apparatus, which may remain unused for any length of time, no part thereof being subjected to any pressure.

In the emergency of fire occurring and the extinguisher is to be brought into requisition, the handle E is turned up, whereby the position of the globe C is inverted and the acid emptied into the vessel A, where it is at once neutralized upon mixing with the soda contained in the water. Carbonic-acid gas is thus generated or produced, and, not being able to escape, forces the entire contents of the vessel A through the cock H when opened.

My improvements are applicable to tanks or cylinders of any size, those to be carried on the back or those mounted on wheels.

Having described my invention, I claim and desire to secure by Letters Patent of the United States—

1. In a fire-extinguisher, the combination, substantially as set forth, of the outer casing, a revolving acid-receptacle within the casing, and a journal, to which the receptacle is connected, projecting through to the outside of the casing.

2. In a fire-extinguisher, the combination, substantially as set forth, of the outer casing, an acid-receptacle adapted to revolve mounted within the casing, a journal to which the receptacle is connected projecting through the casing, and a handle attached to the journal outside of the casing.

3. In a fire-extinguisher, the combination, substantially as set forth, of the outer casing, an acid-receptacle adapted to revolve mounted within the casing, a journal to which the receptacle is connected projecting through the casing, and mechanism on the outside of the casing connected with the journal to secure the acid-receptacle from turning.

4. In a fire-extinguisher, the combination, substantially as set forth, of the alkaline-vessel, an inclosure or bottomless chamber on the top or upper head of the alkaline-vessel, and an acid-receptacle adapted to revolve mounted within the inclosure.

5. In a fire-extinguisher, the combination, substantially as set forth, of an alkaline-vessel having an opening for the admission of water, and an acid-receptacle adapted to discharge its contents in the alkaline-vessel and inclosed within an outer casing having an opening for the introduction of acid to the receptacle.

6. In a fire-extinguisher, the combination, substantially as set forth, of an outer casing, an acid-receptacle supported within the casing, and a stopper pressed against the mouth of the receptacle by a screw-cap.

In testimony that I claim the foregoing I have hereunto set my hand this 12th day of April, 1880.

CHAS. T. HOLLOWAY.

Witnesses:
CHAS. B. MANN,
W. S. WILKINSON.